United States Patent [19]

Suzuki

[11] Patent Number: 4,745,752

[45] Date of Patent: May 24, 1988

[54] EXHAUST GAS TURBINE TYPE SUPERCHARGER

[75] Inventor: Satoshi Suzuki, Katsuta, Japan

[73] Assignee: Hitachi, Ltd., Tokyo, Japan

[21] Appl. No.: 793,765

[22] Filed: Nov. 1, 1985

[30] Foreign Application Priority Data

Nov. 2, 1984 [JP] Japan .................... 59-230199
Dec. 29, 1984 [JP] Japan .................... 59-279706

[51] Int. Cl.$^4$ ............................................. F02D 23/00
[52] U.S. Cl. ...................................................... 60/602
[58] Field of Search .................. 60/600, 601, 602, 603

[56] References Cited

U.S. PATENT DOCUMENTS

| 1,816,787 | 7/1931 | Moss ................................... 60/602 |
| 3,389,553 | 6/1968 | Hardy et al. ...................... 60/602 X |

FOREIGN PATENT DOCUMENTS

| 2558878 | 7/1977 | Fed. Rep. of Germany . |
| 18522 | 2/1983 | Japan ................................... 60/602 |
| 172427 | 10/1983 | Japan ................................... 60/602 |

OTHER PUBLICATIONS

Patent Abstracts of Japan, vol. 9, No. 290 (M-430) [2013], published 7/10/1985, JP 60-128931, assignee Mazda.

Primary Examiner—Stephen F. Husar
Attorney, Agent, or Firm—Antonelli, Terry & Wands

[57] ABSTRACT

An exhaust gas turbine type supercharger in which a casing of a turbine is divided into two chambers along a flow direction of the exhaust gas to form an open scroll and a closed scroll. The open scroll feeds the turbine with the exhaust gas over a full operational range of the engine. The closed scroll is opened to increase a flow rate of the exhaust gas to the turbine when the supercharged pressure is high as in a high load/high speed operation of the engine. A port is formed through a partitioning wall between the open scroll and a downstream exhaust gas passage of the turbine and an opening/closing valve is interposed thereat to thereby bypass the exhaust gas to a downstream portion of the turbine with the port being opened, when the supercharged pressure becomes high.

3 Claims, 5 Drawing Sheets

EXHAUST GAS TURBINE TYPE SUPERCHARGER

FIELD OF THE INVENTION AND RELATED ART STATEMENT

The present invention relates to an exhaust gas turbine type supercharger or turbocharger wherein a compressor is driven by a turbine rotated by exhaust gas, thereby feeding the supercharged air into an internal combustion engine.

In a conventional exhaust gas turbine type supercharger, an exhaust gas from the cylinders of an engine is fed to a turbine so as to rotate the turbine and drive a compressor provided on the same shaft as that of the turbine, with compressed air from the compressor being fed to an intake pipe of the engine. A disadvantage of this type of conventional supercharger resides in the fact that, in a low and middle speed range of the engine, a supply of exhaust gas is insufficient, resulting in a reduction in the turbine output and the supercharged pressure.

In order to avoid the above noted disadvantages, a turbine having a relatively small capacity matching an engine's low speed range is employed and, since the supercharged pressure would be too large during the high speed/high load operation of the engine, a bypass valve is interposed at an inlet of the turbine, with the bypass valve being controlled by an actuator to discharge the extra exhaust gas in order to prevent excessive supercharged pressure. However, if such an exhaust gas bypass control would be carried out, the turbine inlet pressure would be increased relative to the supercharged pressure due to the energy loss caused by the bypassed exhaust gas. In order to avoid this problem, it has been proposed in, for example, U.S. Pat. No. 3,557,549, to use a variable capacity turbine with a capacity which is variable in response to an operational condition of the engine. However, with such a proposal, it would be difficult to make the supercharger match the engine over a wider operational range of the engine, in particular, a gasoline engine.

SUMMARY OF THE INVENTION

An object of the invention is to provide an exhaust gas turbine type supercharger which attains an excellent supercharged pressure characteristic over a full operational range of an engine including low, middle and high speed regions.

According to the present invention, an interior of a casing of a turbine is divided into two scroll chambers by a partition wall so that an exhaust gas from the engine is introduced mainly into one of the scroll chambers in a low speed/low load operational condition of the engine in which a supercharged pressure is maintained at a low level. On the other hand, in a high speed/high load operational condition of the engine in which the supercharged pressure becomes high, a control valve interposed at an inlet of the turbine, is actuated so that the exhaust gas of the engine is introduced into the two scroll chambers. Also, in order to obtain an excellent supercharged pressure characteristic over a wide operational condition, the exhaust gas is bypassed by an exhaust gas bypass valve.

According to another aspect of the invention, an interior of a casing of a turbine is divided into two scroll chambers by a partition wall so that exhaust gas, flowing through the scroll chambers is controlled in correspondence with the engine's operational condition, and an exhaust gas bypass system is additionally used so that an excellent supercharged pressure may be obtained over a full and wide operational condition of the engine. Therefore, a responsiveness at a rapid acceleration and a low speed torque characteristic of the engine are improved and a turbine inlet pressure at a high engine speed is prevented from being excessive to thereby improve a fuel consumption rate.

DETAILED DESCRIPTION

A first embodiment of the invention will now be described with reference to FIGS. 1 to 3.

Figure 1:
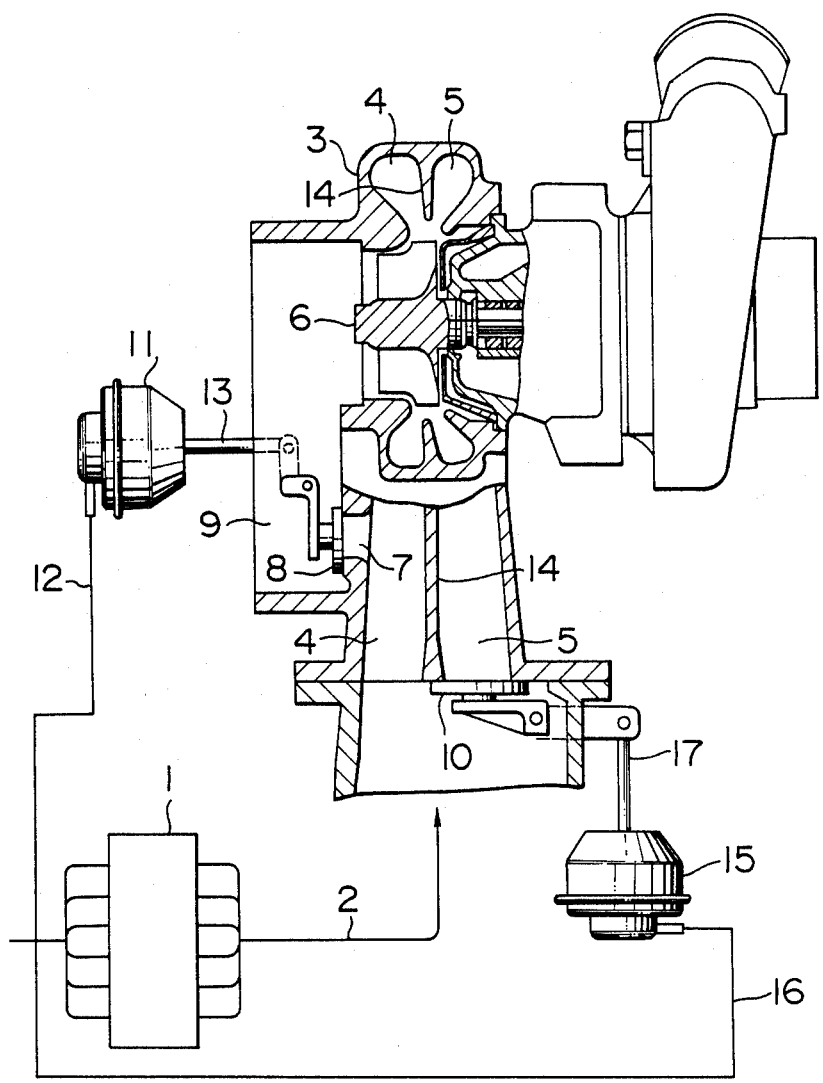
FIG. 1 is a partially schematic cross-sectional view of a primary portion of an exhaust gas turbine type supercharger in accordance with one embodiment of the invention.

Referring now to the drawings wherein like reference numerals are used throughout the various views to designate like parts and, more particularly, to FIG. 1, in an exhaust gas turbine type supercharger in accordance with the invention, exhaust gas, discharged from an engine 1, is introduced through an exhaust manifold 2 into a casing 3 of a turbine 6, with the casing 3 being divided into two scroll chambers 4, 5 by a partition wall 14. An exhaust gas bypass valve 8 is provided on the side of the open scroll chamber 4, and the closed scroll chamber 5 is closed by a control valve 10.

In a low speed/low load operational condition of the engine, the exhaust gas is introduced into the open scroll chamber 4. When a flow rate of the exhaust gas is increased, the supercharged pressure is increased. As a result, the supercharged pressure is applied from a feed passage 12 to a first diaphragm type actuator 11. When the supercharged pressure exceeds a predetermined constant level, a rod 13 is moved so that the exhaust bypass valve 8 which is actuated by an end of the rod 13 is opened. Then the exhaust gas is discharged to a turbine outlet side 9 through a bypass port 7 formed in the open scroll chamber 4. In a high speed/high load operational condition in which the rate of exhaust gas flow is increased, when the supercharged pressure introduced from a feed passage 16 of a second diaphragm type actuator 15 exceeds a predetermined constant level, a rod 17 is moved to open the control valve 10. The opening pressure of the actuators 11, 15 is determined by selecting the biasing force of the actuators 11, 15. When the control valve 10 is opened, a first turbine operational mode is changed to a second turbine operational mode therefore, a rotational speed of the turbine 6 is decreased and, as a result, a rotational speed of the compressor is decreased. It is, therefore, unnecessary to discharge the required exhaust gas through the exhaust bypass port 7. Consequently, the exhaust bypass valve 8 is controlled so as to be closed at once due to the decrease of the supercharged pressure. Since the supercharged pressure will be increased as described before when the flow rate of the exhaust gas is increased, the exhaust bypass valve 8 is controlled toward an open position by the actuator 11. It is possible to construct the respective actuators 11 and 15 so as to be controlled in accordance with the exhaust gas pressure.

Figure 2:
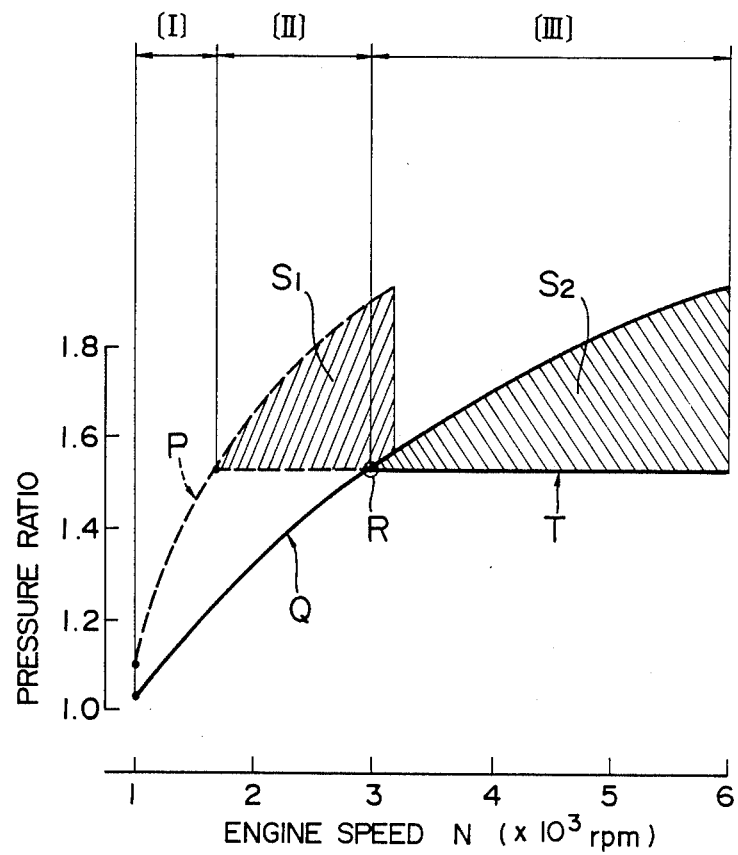
FIG. 2 is a graphical illustration of a supercharged pressure control characteristic of the exhaust gas turbine type supercharger shown in FIG. 1.

In FIG. 2, an abscissa denotes an engine speed and an ordinate denotes a pressure ratio of the supercharged pressure. In operation with the open scroll chamber 4 only, the pressure ratio is indicated by a curve P. In contrast, in the operation with the two scroll chambers, the control valve 10 of which is under the opened condition, is indicated by a curve Q. In order to obtain a target pressure ratio T, the exhaust bypass valve 8 and the control valve 10 are opened in the pressure ratio regions $S_1$ and $S_2$ where the uncontrolled pressure ratio is higher than a target pressure ratio.

The characteristic obtained by such an operation will be explained in more detail as follows:

In region [I]:

The supercharging is attained with the open scroll chamber 4 only.

In region [II]:

The supercharging is attained with the open scroll chamber 4 only but the exhaust gas corresponding to the pressure ratio region $S_1$ exceeding the target pressure ratio T is released by the operation of the exhaust gas bypass valve 8. In this case, the control valve 10 is opened at the point R and simultaneously therewith, the exhaust gas bypass valve 8 is fully opened.

In region [III]:

The supercharging is attained with both the open scroll chamber 4 and the closed scroll chamber 5 but the exhaust gas corresponding to the pressure ratio region $S_2$, exceeding the target pressure ratio T, is released by the operation of the exhaust gas bypass valve 8.

As described above, in accordance with the first embodiment, it is possible to obtain the supercharging characteristic which is needed over a wide range covering the low speed to high speed operations.

Figure 3:
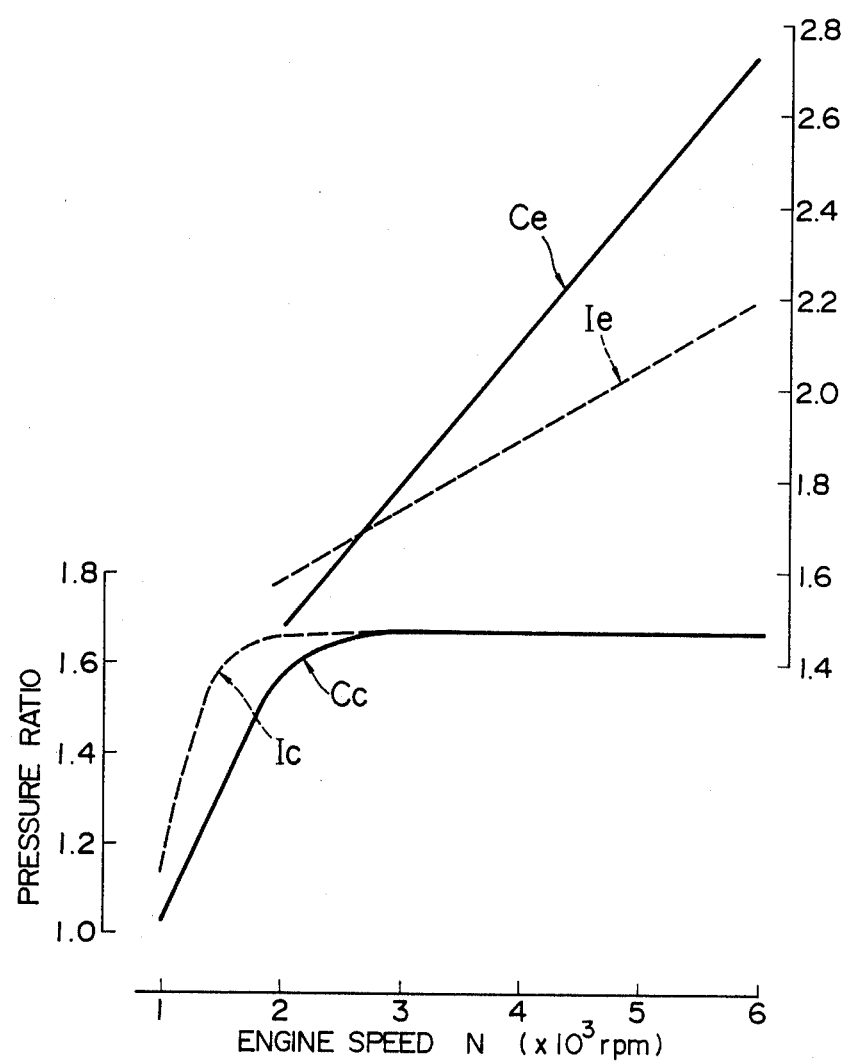
FIG. 3 is a graphical illustration of a comparison in supercharged pressure characteristic between the exhaust gas turbine type supercharger in accordance with the invention and a standard type exhaust gas turbine in accordance with the prior art.
Figure 4:
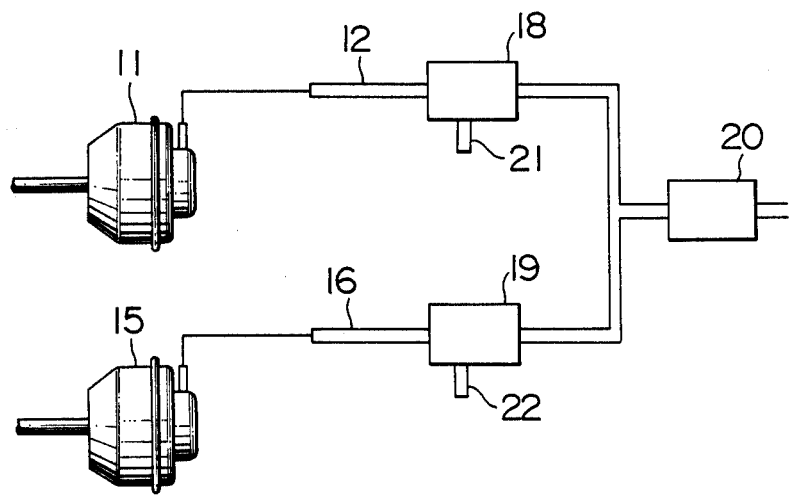
FIG. 4 is a schematic view showing another embodiment of the invention.

In FIG. 3 the reference character Ic indicates a supercharged pressure characteristic of the exhaust gas turbine type supercharger in accordance with the first embodiment and Ie indicates an exhaust gas pressure characteristic thereof. Cc and Ce indicate a supercharged pressure characteristic and an exhaust gas pressure characteristic of a standard type exhaust gas turbine type supercharger.

As apparent from FIG 3, according to the exhaust gas turbine type supercharger of the invention, the supercharged pressure characteristic at the low speed is excellent, a low speed torque is enhanced and the exhaust pressure characteristic at the high speed is much decreased, thus improving the fuel consumption rate.

In the first embodiment, the exhaust gas bypass valve 8 and the control valve 10 are controlled by the actuators 11 and 15 which are directly driven by the supercharged pressure but the following control is preferable to increase a degree of freedom in the supercharged pressure characteristic.

Namely, an ON/OFF solenoid valves 18 and 19 to be duty controlled are interposed in the feed passages 12 and 16 for the actuators 11 and 15, respectively. The ON/OFF solenoid valves 18 and 19 are pneumatically connected to a constant pressure regulating valve 20 so that the supercharged pressure downstream of the compressor is introduced into the actuators 11 and 15 therethrough.

The constant pressure regulating valve 20 regulates the supercharged pressure at a substantially constant pressure and applies it to the ON/OFF solenoid valves 18 and 19 which, in turn, open atmospheric vent ports 21 and 22, respectively. As a result, the supercharged pressure applied to the respective actuators 11 and 15 is controlled in a positive manner.

Control signals to be given to the ON/OFF solenoid valves 18 and 19 will be explained. In the first embodiment, the characteristic is obtained by directly controlling the respective actuators 11 and 15 with the supercharged pressure but it would be difficult to obtain a fine control of the characteristic.

Figure 5:
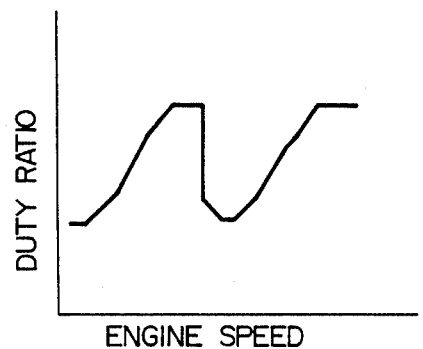
FIGS. 5 and 6 are graphical illustration of characteristics of the engine speed and duty ratio.
Figure 6:
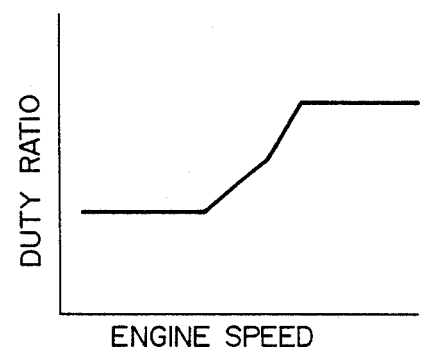

Therefore, in accordance with a second embodiment of the invention, duty ratios of the ON/OFF solenoid valves 18, 19 relative to the engine speed as shown in FIGS. 5 and 6 are stored into an ROM (Read Only Memory) of a micro-computer and the solenoid valves 18 and 19 are actuated by the duty ratios read out from the ROM.

FIG. 5 graphically depicts a characteristic to be applied to the solenoid valve 18 which, in turn, controls the actuator 11, and FIG. 6 graphically depicts a characteristic to be applied to the solenoid valve 19 which, in turn, controls the actuator 15.

Figure 7:
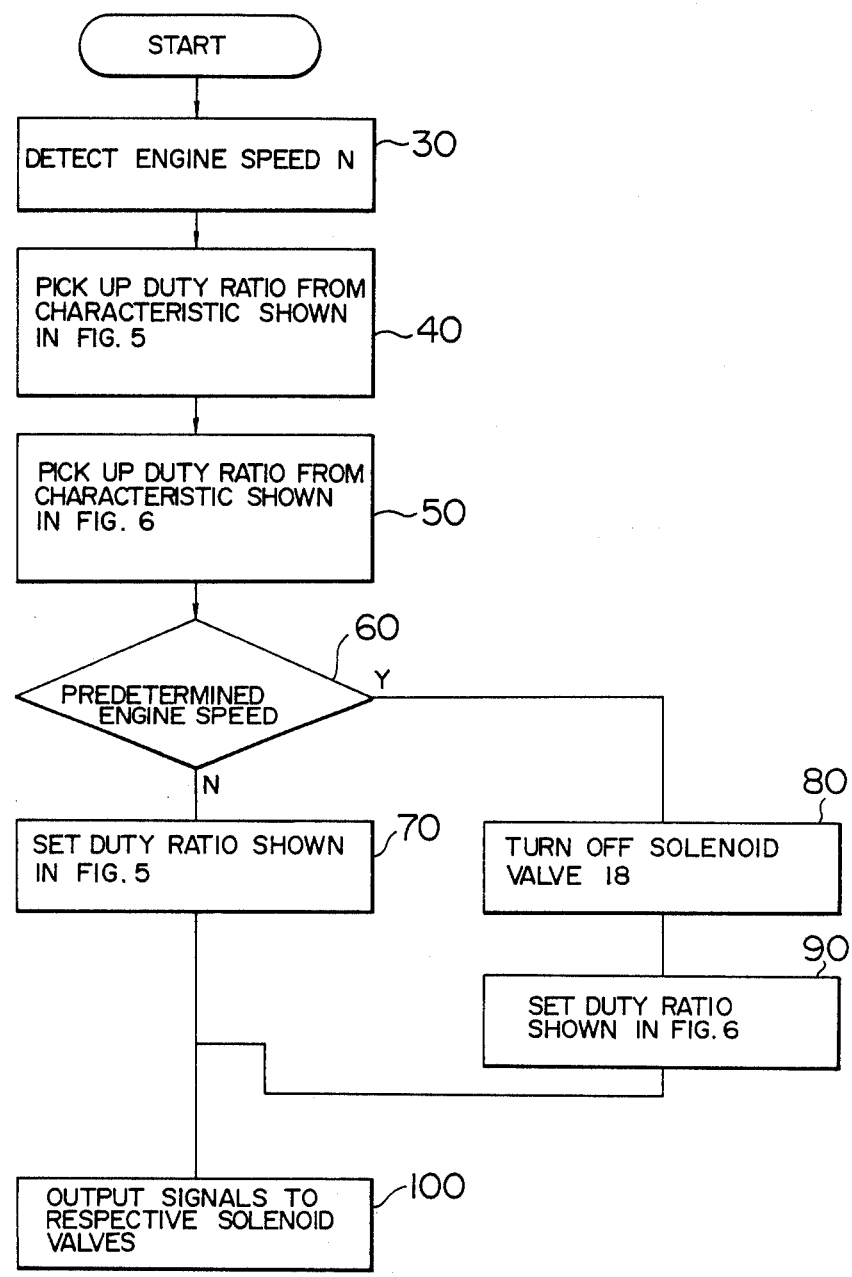
FIG. 7 is a control flowchart according to the invention.

As shown in FIG. 7, the engine speed N is detected in the step 30 and the characteristics (duty ratios), shown in FIGS. 5 and 6, are picked up according to the engine speed N in the steps 40 and 50.

Subsequently, in the step 60, it is judged whether or not the engine speed N is below a predetermined engine speed. The step 60 corresponds to the operation in which the engine speed corresponding to the point R shown in FIG. 2 is picked up.

On the other hand, if, in the step 60, it is judged that the engine speed N is below the predetermined engine speed, then the solenoid valve 19 is turned OFF (the atmospheric vent port 21 is opened) in the step 80 and the characteristic value of FIG. 5 is set in a resistor in the step 90.

Upon completion of the above steps, in the steps 100, 100', predetermined signals are outputted to the respective solenoid valves 18 and 19. In this case, the opening degree rates of the exhaust bypass valve 8 and the control valve 10 are not rapidly changed but gradually changed, thus obtaining an excellent supercharging characteristics.

What is claimed:

1. An exhaust gas turbine type supercharger for an engine, the supercharger having a turbine and a compressor, a casing means for receiving said turbine, partition wall means for dividing the casing means into two scroll chambers, and means for supplying an exhaust gas to said two scroll chambers to rotate said turbine and to feed the engine with supercharged air through said compressor, said supercharger comprising a bypass passage means for connecting one of said scroll chambers to a portion downstream of said turbine, a first flow rate control valve means for controlling a flow rate of the exhaust gas passing through said bypass passage means, and a second flow rate control valve means for controlling a flow rate of the exhaust gas being fed to the other of said scroll chambers, and means for controlling said first and second flow rate control valve means in accordance with an electric signal representing an engine RPM corresponding to a supercharged pressure.

2. An exhaust gas turbine type supercharger as claimed in claim 1, wherein said first flow rate control valve means decreases the flow rate of the exhaust gas passing through said bypass passage means when said second flow rate control valve means is opened.

3. An exhaust gas turbine type supercharger for feeding an exhaust gas from cylinders of an engine to a turbine, thereby drivingly rotating the turbine to drive a compressor mounted on the same shaft as the turbine so that the compressor compresses air to be fed to the cylinders of the engine, comprising:
- a partition wall means for dividing a casing of said turbine into two scroll chambers;
- an exhaust gas flow rate control means for introducing the exhaust gas mainly into only one of said scroll chambers in a low speed/low load operation of the engine in which the supercharged pressure is lower than a first predetermined level and for introducing the exhaust gas of the engine into said two scroll chambers in a high speed/high load operation of the engine in which the supercharged pressure is higher than said first predetermined level, including an opening/closing valve interposed at an inlet of the other of said scroll chambers and a diaphragm type activator for controlling an opening degree of said opening/closing valve in response to a magnitude of said supercharged pressure;
- an exhaust gas bypass means for discharging to a portion downstream of said turbine a part of the exhaust gas fed to said turbine through one of said scroll chambers when the supercharged pressure is higher than a second predetermined level, including a port formed in a wall between said one of said scroll members and a downstream exhaust gas passage of said turbine, an opening/closing valve for opening and closing said port and a diaphragm type actuator for controlling an opening degree of said last mentioned opening/closing valve in response to a magnitude of said supercharged pressure; and
- means for controlling the exhaust gas flow rate means in response to an engine RPM signal corresponding to the supercharged pressure,
- wherein each of said diaphragm type actuators comprises an ON/OFF valve whose opening/closing duty is controlled in accordance with an electrical signal representing an engine RPM.

* * * * *